April 11, 1961 J. W. SADLER 2,979,309
FLUID COOLING APPARATUS
Filed Sept. 26, 1958 3 Sheets-Sheet 1

Inventor
John W. Sadler,
By John C. Brady
Attorney

April 11, 1961
J. W. SADLER
2,979,309
FLUID COOLING APPARATUS
Filed Sept. 26, 1958
3 Sheets-Sheet 2
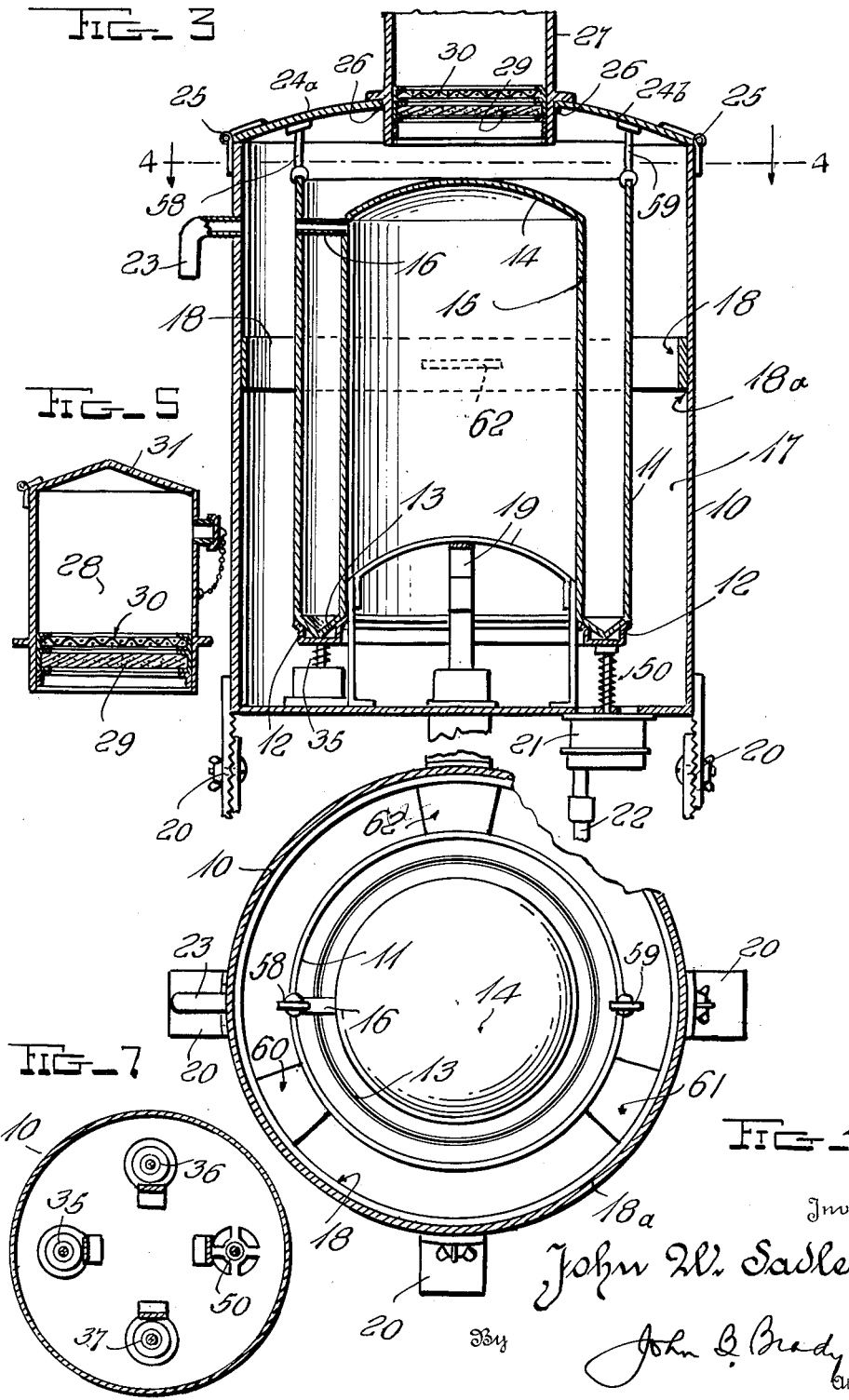
Inventor
John W. Sadler,
By John B. Brady
Attorney

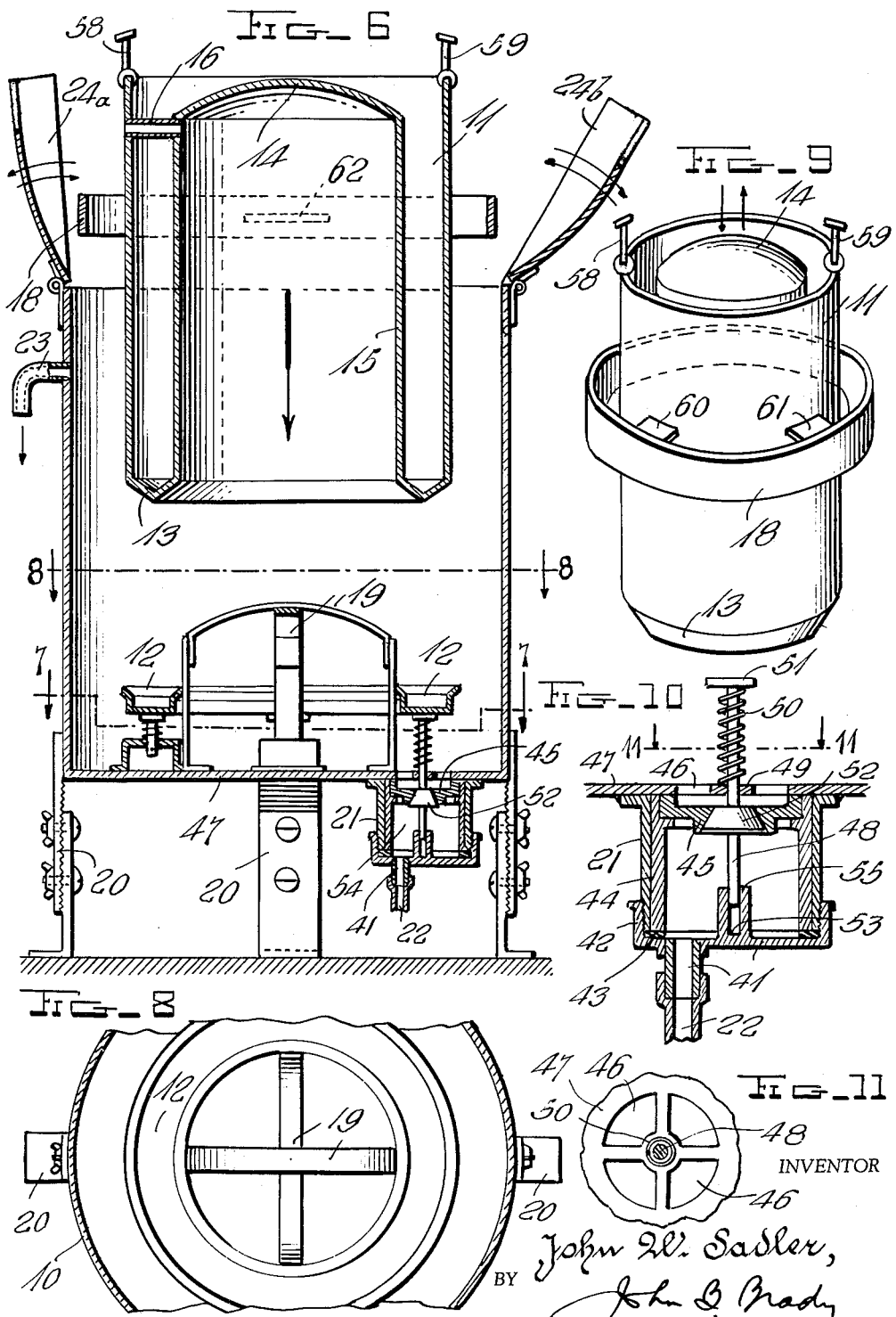

United States Patent Office 2,979,309
Patented Apr. 11, 1961

2,979,309

FLUID COOLING APPARATUS

John W. Sadler, Albuquerque, N. Mex. (Alburnett, Iowa)

Filed Sept. 26, 1958, Ser. No. 763,736

3 Claims. (Cl. 257—195)

My invention relates broadly to fluid coolers and more particularly to milk coolers enabling dairymen to cool milk or cream immediately as it comes from the cows or from a separator in a manner preventing multiplication of bacteria which is otherwise encouraged by the presence of residual animal heat.

One of the objects of my invention is to provide a construction of milk or cream cooler which is particularly adapted for use in small or medium-sized dairies where installation of a very large and expensive unit may be impracticable.

Another object of my invention is to provide a construction of milk cooler wherein a large surface of the milk is exposed to the cooling effect of cold circulating water immediately after the milk comes from the cows or from a separator for retarding the growth of bacteria otherwise promoted by residual animal heat.

Still another object of my invention is to provide a construction of milk cooler consisting of a cylindrical container of toroidal transverse section which may be introduced into a vertically extending cylindrical container or housing through which cooling fluid is circulated for maintaining the milk cold before it is processed.

A further object of my invention is to provide a toroidal shaped cylindrical container for milk which is readily centered into a correspondingly shaped housing having a yieldable toroidal shaped seat therein for receiving the container in a vertically erect position with means associated with the said seat for cutting on the supply of cold water to the housing for circulation around the container within the housing for cooling the milk automatically.

A still further object of my invention is to provide an arrangement of cylindrical container of toroidal section for milk which is equipped with an annular centering and supporting member thereon facilitating the removal and insertion of the container with respect to a correspondingly shaped fluid cooled housing through which cooling fluid is circulated.

Still another object of my invention is to provide a construction of milk cooler having a pair of substantially semicircular top closure members hingedly connected at diametrically opposite positions at the top of a cylindrical container and adapted to form a closure having a central opening therein for the insertion of either a plug and filter assembly or a funnel and filter assembly for the deposit of milk into an insertable and removable container within the aforesaid container for the storage of milk while a cold fluid is being circulated around the last mentioned container and within the first mentioned container.

Other and further objects of my invention reside in the construction of a milk and cream cooler as set forth more fully in the specification hereinafter following by reference to the accompanying drawings in which:

Fig. 3 is a vertical sectional view through a fragmentary portion of the milk cooler taken on line 3—3 of Fig. 2 and showing the funnel delivery device and the filter assembly therein in position in the top of the receptacle, the supporting feet of the receptacle being broken away to facilitate showing the parts of the structure on a larger scale;

Fig. 4 is a transverse sectional view taken on line 4—4 of Fig. 3;

Fig. 5 is a fragmentary vertical sectional view taken through the plug and filter assembly shown in Figs. 1 and 2;

Fig. 6 is a vertical sectional view through the milk or cream cooler of my invention, showing the closure doors at the top of the receptacle open and the container being inserted or removed from the receptacle and showing particularly the means for admitting cooling water to the receptacle;

Fig. 7 is a horizontal sectional view taken substantially on lin 7—7 of Fig. 6, on a smaller scale, and illustrating the yieldable means which supports the container and the valve control means for admitting cooling means to the receptacle;

Fig. 8 is a fragmentary horizontal sectional view taken substantially on line 8—8 of Fig. 6, and illustrating particularly the centering means at the bottom of the receptacle and the annular support for the container;

Fig. 9 is a perspective view of the container removed from the receptacle;

Fig. 10 is an enlarged vertical sectional view through the cooling water feed means for the receptacle of the milk or cream cooler; and Fig. 11 is a fragmentary horizontal sectional view taken on line 11—11 of Fig. 10.

Figure 1:
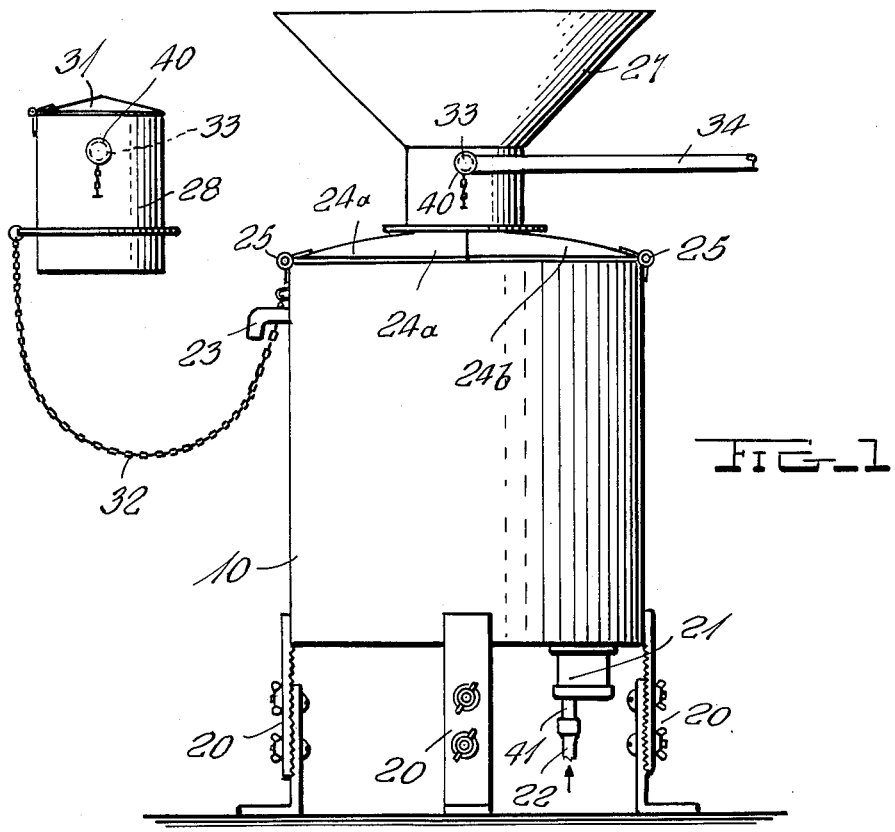
Fig. 1 is a side elevational view of the milk and cream cooler of my invention showing the funnel delivery device in position at the top of the receptacle prepared for receiving the milk for cooling and also illustrating the plug and filter assembly which may be used in place of the funnel delivery device for closing the receptacle against the entry of dust or dirt.

My invention is directed to a milk or cream cooler which is suitable for application in small or medium sized dairies where installation of a very large and expensive unit would be impracticable. The milk or cream cooler of my invention is used in association with milking machines or milk and cream separators or is applicable for cooling milk immediately after hand milking operations where it is important to prevent the growth of bacteria in the milk which is promoted by the presence of residual animal heat. The milk cooler of my invention consists of a vertically erect cylindrical receptacle which contains an annular seat adjacent the interior bottom of the receptacle and with respect to which a cylindrical container for milk or cream where the container has concentrically shaped walls of substantially toroidal transverse section is seated. The container provides a very large cooling surface for the milk or cream which is stored therein as cold water is circulated within the receptacle around the outside and within the inside walls of the container. This cooling water is turned on automatically simply by insertion of the toroidal shaped container into a position where the container rests upon the annular seat, the mass of the container being sufficient to automatically open the water supply valve to initiate circulation of cooling water through the receptacle and for discharge of the overflow water from one side of the receptacle substantially below the level of the open top of the container. To insure the cleanliness of the milk I provide both a funnel delivery device associated with a filter assembly and a plug device associated with a filter assembly, both of which are equipped to provide a connection with the milk line from milking machines or milk and cream separators whereby milk or cream may be directed into the milk container within the cooler. According to the conditions of operation the funnel device or the plug device may be fitted into a central opening between substantially semispherical cover members at the top of the receptacle for directing milk or cream through filter units into the milk or cream container within the receptacle. An observing window is provided in one of the cover members to enable the conditions of the milk in the container and the conditions with respect to the circulation of the cooling water to be observed at all times.

Provision is made for properly centering the container within the receptacle both by a centering device which enters the interior of the center portion of the container and also by means of an annular centering rim which is attached to the outside of the receptacle and facilitates the carrying of the loaded receptacle and the insertion thereof into the cooling fluid in the main receptacle.

Referring to the drawings in more detail, reference character 11 indicates the cylindrical container or jacket for milk or cream where the container or jacket has a wall structure of substantially toroidal shape in transverse section. As shown more clearly in Figs. 3, 4 and 5 the container 11 fits concentrically within the receptacle 10 which is supported in vertically erect position on adjustable strap-like feet or supports 20 which may be seated upon any desired supporting surface. The receptacle is closed at the top thereof by means of a pair of approximately semi-spherical cover members 24a and 24b forming parts of the top or cover for the device. Each of these sections are hinged in diametrically opposite positions as indicated at 25 to the top of the exterior wall of the receptacle 10. Each cover section 24a and 24b is provided with a semi-circular opening which when aligned form a circular opening 26 through which the funnel delivery device 27 or the plug 28 may be inserted. Both the funnel delivery device 27 and the plug device 28 include as part of their assemblies the bottom strainer 29 holding a sediment pad and an upper strainer 30 of fine wire mesh to strain and filter dust and other unwanted dirt etc. which may be in the milk or cream which is poured into either the funnel device 27 or the plug device 28. Both the funnel device 27 and the plug device 28 include a tap connection 33 which is either closed by the threaded tap 40 or coupled to the milk delivery line 34 for delivering the milk or cream through the filter screens 29—30 to the milk or cream container 11.

The milk or cream container 11 is centered within the receptacle 10 by means of the annular seat 12 located in the bottom of receptacle 10 in a position extending around the guide unit 19 erected on the central portion of the bottom of receptacle 10 and dimensioned so that the hollow interior of the container 11 fits over the guide unit as shown more clearly in Fig. 3. The exterior of container 11 is provided with an annular guide and hand grip shown at 18. This band which surrounds the outside of the container 11 is supported from container 11 by members 60, 61 and 62 spaced at approximately 120° which insures the circulation of cooling fluid therebetween throughout the interior of the receptacle 10. The annular guide and hand grip 18 is spaced from the interior wall of receptacle 10 as represented at 18a sufficiently to allow the up and down movement of the container 11 in a substantially vertically erect position on annular seat 12 within receptacle 10.

The container or jacket 11 has a substantially V-shaped annular bottom 13 which rests upon the annular seat 12 and the upper portion of the interior of the container or jacket 11 is dome-shaped as represented at 14 enabling the milk or cream as it strikes the upper surface of the dome-shaped portion 14 to be directed into the toroidal shaped portion of the container or jacket 11 with a relatively large surface area 15 disposed interiorly of the container or jacket and subject to the circulation of cooling fluid. To facilitate the passage of the circulating water on the interior surface 15 of container or jacket 11 a port or pipe 16 extends in a position adjacent the dome-shaped top 14 of container or jacket 11 interiorly of the container or jacket at the surface 15 to the outside of the container or jacket where the water is circulating in the receptacle 10. Thus the cooling fluid circulates entirely around the toroidal-shaped wall of the container or jacket in the space 17 between the exterior wall of container or jacket 11 and the interior wall of receptacle 10 as well as around the surface of the interior of container or jacket 11 at 15 and underneath the surface of dome-shaped portion 14.

Cooling water is supplied to the receptacle 10 through a fitting 21 attached to the bottom of the receptacle 10 and supplied with cooling fluid under pressure through pipe-line 22. The line 22 is attached to a pipe 41 extending from a cap 42 which is interiorly screw-threaded for engaging exteriorly screw-threaded fitting 21 and which is provided with a gasket 43 for sealing the cap 42 with respect to the fitting 21. A cylindrical liner 44 is provided within fitting 21 and supports a valve seat 45 therein immediately below radial ports 46 in the bottom 47 of the receptacle 10. A valve rod 48 extends upwardly through a central aperture 49 in the bottom 47 of the receptacle and is encircled by a compression spring 50 disposed beneath the depressible head 51. A valve 52 is carried by valve rod 48 and coacts with valve seat 45. The valve rod 48 extends into socket-like guide means 53 by which the valve 52 may be shifted to a displaced position with respect to annular valve seat 45 under the weight of the container 11 when resting upon the annular seat 12 for admitting water from the supply line 22 under pressure into the receptacle 10. The chamber 54 formed by the fitting 21 and the cylindrical liner 44 serves as a surge-eliminating-chamber or reservoir for insuring a more uniform flow of the cooling fluid into the receptacle 10. The downward displacement of valve 52 is limited by the abutment of the end of valve rod 48 with the end of the socket-like guide means 53 open at 55. The level of the cooling water in the receptacle 10 is governed by the overflow pipe 23 beyond which level the cooling water does not rise.

The plug 28 is shown more clearly in Fig. 5, including a filter assembly 29—30 connected to the filter assembly in the funnel delivery device 27. A hinged cover 31 on the plug 28 enables milk or cream to be deposited into the plug for filtered delivery to the container or jacket 11 in the same way that milk or cream may be deposited through the funnel device 27 which is wholly interchangeable with the plug 28. The plug 28 is confined to the receptacle 10 through a flexible chain 32 to avoid loss of a plug and to insure the immediate readiness of the plug to be inserted into the top of the receptacle when the funnel delivery device 27 is removed. The annular seat 12 on which the V-shaped bottom 13 of container or jacket 11 rests is yieldably supported by compression springs 35, 36 and 37 which serve to support members disposed beneath the annular seat 12. As the weight of the container or jacket 11 becomes effective on the annular seat 12 these springs are compressed, serving to balance the mass of the container or jacket 11 and, in addition, because spring 50 is depressed, enabling the water supply valve 52 to be actuated for admitting cooling water into the receptacle 10. The guide unit 19 is disposed and centered within the annular seat 12 and projects above the seat 12 enabling the container or jacket 11 to be moved downwardly as represented in Fig. 6, guided by the annular guide and hand-grip 18 on the outside of the container or jacket 11 and by the guide unit 19 at the inside of the container or jacket 11.

In the operation of the cooler of my invention the equipment is mounted in a location convenient either to milking machines or a milk and cream separator or the milking area where hand-milking may be employed. The equipment is adjusted to the most convenient height by means of the adjustable supports 20. The plug 28 is removed from its seat with respect to the substantially spherical cover members and the cover members 24a and 24b opened, as represented in Fig. 6.

Figure 2:
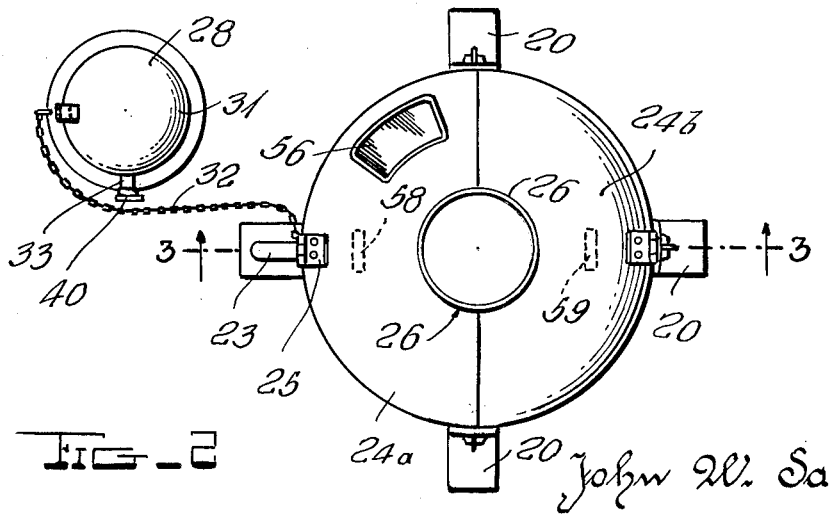
Fig. 2 is a top plan view of the milk and cream cooler of my invention showing the funnel delivery device withdrawn and the receptacle ready to receive the associated plug and filter assembly.

The container or jacket 11 is lowered into position as represented in Fig. 6 by grasping the handle members 58 and 59, where it rests upon the annular seat 12 and by reason of the weight thereof opens the valve 52 enabling cooling fluid to flow from pipe line 22 into the receptacle 10, overflowing at 23. The cover members 24a and 24b are then closed against the upper ends of the handle members 58 and 59 thrusting the container or jacket 11 against annular seat 12, and the funnel device 27 inserted in the position previously occupied by the plug 28. Milk or cream is then delivered through pipe 34 and tap connection 33 to a position above the filter 29, 30, or milk is deposited into the top of the device for filtration through filter 29, 30 and delivery over the top of the dome 14 into the container or jacket 11. By reason of the large surface exposure of the milk or cream in the container or jacket 11 and the movement of the cooling water over both the interior and exterior surface of container or jacket 11, the milk or cream in container or jacket 11 is chilled or cooled. The condition within the container or jacket 11 and the interior of the receptacle 10 may be observed through the transparent window 56 located in one of the hinged cover members which, in Fig. 2, is shown in cover member 24a.

After chilling of the milk or cream in container or jacket 11 the funnel device 27 is removed, the cover members 24a and 24b opened and the container or jacket 11 removed as represented in Fig. 6, for example, in order to treat or otherwise utilize the milk or cream.

I have found the equipment of my invention highly satisfactory and efficient and while I have described my invention in its preferred embodiments I realize that modifications may be made and I desire that it be understood that no limitations upon my invention are intended other than may be imposed by the scope of the appended claims.

What I claim as new and desire to secure by Letters Patent of the United States is as follows:

1. A fluid cooler comprising a vertically extending receptacle, a fluid container centered within said receptacle, a centering device located in the bottom of said receptacle, a closure on the top of said receptacle for permitting the insertion or removal of the fluid container, said fluid container having a wall section of substantially toroidal contour terminating in a top end wall which is disposed immediately below said closure when said container is wholly inserted in said receptacle, said container including interior and exterior walls interconnected at the bottom thereof for forming an annular jacket for fluid and wherein the interior wall of said jacket engages said centering device for spacing said container concentrically within said receptacle, means for circulating a cooling fluid through said receptacle and around the interior and exterior walls of said jacket, a yieldably mounted annular seat disposed in the bottom of said receptacle surrounding the centering device, the bottom of said jacket engaging said seat and receiving the centering device and aligned thereby, a valve connected to said receptacle, a fluid pressure source connected to said valve, and means connecting said valve with said seat for control by the movement of said seat under the mass of said jacket for controlling the flow of fluid from said fluid pressure source through said valve into said receptacle.

2. A fluid cooler as set forth in claim 1 in which said jacket has at least a pair of diametrically spaced vertically extending handle members projecting therefrom and engageable by said closure when said closure is in closed position for exerting a downward thrust upon said jacket for maintaining said jacket in a position engaging said centering device and maintaining said valve open for the flow of fluid into said receptacle while said container is mounted therein.

3. A fluid cooler as set forth in claim 1 in which said jacket has an annular guide concentrically surrounding the exterior wall thereof shaped to slidably fit within the interior of said receptacle for guiding said jacket into and out of said receptacle, said guide being connected with the exterior wall of said jacket by spaced arms allowing circulation of cooling fluid therebetween.

References Cited in the file of this patent

UNITED STATES PATENTS

| 1,854,169 | Fryhofer | Apr. 19, 1932 |
| 2,150,751 | Sadler et al. | Mar. 14, 1939 |
| 2,739,729 | Jonas | Mar. 27, 1956 |